United States Patent
Smithson

(10) Patent No.: US 8,560,268 B2
(45) Date of Patent: Oct. 15, 2013

(54) SYSTEM AND METHOD FOR SENSING A LIQUID LEVEL

(75) Inventor: Mitchell Carl Smithson, Pasadena, TX (US)

(73) Assignee: Chevron U.S.A., Inc., Sam Ramon, CA (US)

( * ) Notice: Subject to any disclaimer, the term of this patent is extended or adjusted under 35 U.S.C. 154(b) by 296 days.

(21) Appl. No.: 13/100,599

(22) Filed: May 4, 2011

(65) Prior Publication Data

US 2012/0084055 A1 Apr. 5, 2012

Related U.S. Application Data

(63) Continuation-in-part of application No. PCT/US2010/051283, filed on Oct. 4, 2010.

(51) Int. Cl.
  *G01V 3/18* (2006.01)
  *G01B 5/18* (2006.01)
  *G01B 7/26* (2006.01)
  *G01B 13/14* (2006.01)

(52) U.S. Cl.
  USPC ................................ 702/166; 702/6; 702/189

(58) Field of Classification Search
  USPC .............................................. 702/6, 166, 189
  See application file for complete search history.

(56) References Cited

U.S. PATENT DOCUMENTS

| | | | |
|---|---|---|---|
| 4,135,397 A | 1/1979 | Krake | |
| 4,621,264 A | 11/1986 | Yashiro et al. | |
| 4,793,178 A | 12/1988 | Ahern et al. | |
| 6,237,410 B1 | 5/2001 | Dyck et al. | |
| 6,250,601 B1 | 6/2001 | Kolar et al. | |
| 6,480,000 B1 | 11/2002 | Kong et al. | |
| 6,525,540 B1 | 2/2003 | Kong et al. | |
| 6,640,628 B2 | 11/2003 | Lütke et al. | |
| 2002/0053239 A1 | 5/2002 | Fehrenbach et al. | |
| 2004/0046571 A1 | 3/2004 | Champion et al. | |

FOREIGN PATENT DOCUMENTS

WO 2011/044023 A2 4/2011

OTHER PUBLICATIONS

U.S. Office Action, regarding U.S. Appl. No. 12/573,434, notification date Jun. 18, 2012.
International Search Report and Written Opinion, regarding PCT/US2012/036523, mailed Aug. 28, 2012.
Stephan Henzler, "Time-To-Digial Converter Basics," 2010, Spring Netherlands, XP002681818, ISBN: 978-90-481-8628-0, vol. 29, pp. 5-18, 15 pages.
International Search Report and Written Opinion for PCT International Patent Application No. PCT/US2010/051283, mailed Aug. 19, 2011.
International Preliminary Examination Report for PCT International Patent Application No. PCT/US2010/051283, mailed on Apr. 19, 2012.

*Primary Examiner* — Janet Suglo
(74) *Attorney, Agent, or Firm* — Pillsbury Winthrop Shaw Pittman LLP

(57) ABSTRACT

A system, method and device may be used to monitor fluid levels in a borehole. The system includes a pulse generator to generate a pulse of electromagnetic energy to propagate along the wellbore towards a surface of the fluid, a detector to detect a portion of the electromagnetic pulse reflected from the surface of the fluid and propagated along the wellbore towards the detector, a processor to analyze detected signals to determine a level of the surface of the fluid. In an embodiment, the system includes a pump controller to control the operation of a pump located in the wellbore based on the fluid surface level.

19 Claims, 5 Drawing Sheets

SYSTEM AND METHOD FOR SENSING A LIQUID LEVEL

This application is a continuation-in-part of PCT/US2010/051283 filed Oct. 6, 2010, which is incorporated by reference in its entirety herein.

BACKGROUND

1. Field

The present invention relates generally to remote sensing and more particularly to sensing a liquid level at a remote location in a borehole.

2. Background

In resource recovery, it may be useful to monitor various conditions at locations remote from an observer. In particular, it may be useful to provide for monitoring liquid levels at or near to the bottom of a borehole that has been drilled either for exploratory or production purposes. Because such boreholes may extend several miles, it is not always practical to provide wired communications systems for such monitoring.

SUMMARY

An aspect of an embodiment of the present invention includes an apparatus for measuring a fluid level in a casing-lined wellbore, including a pulse generator, positionable and operable to generate a pulse of electromagnetic energy to propagate along the wellbore towards a surface of the fluid, a detector, positionable and operable to detect a portion of the electromagnetic pulse reflected from the surface of the fluid and propagated along the wellbore towards the detector, a processor, configured and arranged to receive signals from the detector representative of the detected portion of the electromagnetic pulse and to analyze them to determine a level of the surface of the fluid, and a pump controller, configured and arranged to receive distance information from the processor and to use the distance information to control the operation of a pump located in the wellbore.

An aspect of an embodiment of the present invention includes an apparatus for measuring a fluid level in a casing-lined wellbore, including a pulse generator, positionable and operable to generate a pulse of electromagnetic energy to propagate along the wellbore towards a surface of the fluid, a detector, positionable and operable to detect a portion of the electromagnetic pulse reflected from the surface of the fluid and propagated along the wellbore towards the detector, a processor, configured and arranged to receive signals from the detector representative of the detected portion of the electromagnetic pulse and to analyze them to determine a level of the surface of the fluid.

An aspect of an embodiment of the present invention includes a system for measuring a fluid level in a wellbore that includes a pulse generator, positionable and operable to generate a pulse of electromagnetic energy to propagate along the wellbore towards a surface of the fluid, a detector, positionable and operable to detect a portion of the electromagnetic pulse reflected from the surface of the fluid and propagated along the wellbore towards the detector and a processor, configured and arranged to receive a signal from the detector representative of the detected portion of the electromagnetic pulse and to analyze it to determine a level of the surface of the fluid.

Another aspect of an embodiment of the present invention includes a system for measuring two unmixed fluid levels in a wellbore containing a first wellbore fluid and a second wellbore fluid, the second wellbore fluid having and a lower density than that of the first fluid and a dielectric constant that is both known and substantially lower than that of the first fluid, the system including a pulse generator, positionable and operable to generate a pulse of electromagnetic energy to propagate along the wellbore towards a surface of the fluids, a detector, positionable and operable to detect respective portions of the electromagnetic pulse reflected from the surfaces of the fluids and propagated along the wellbore towards the detector, and a processor, configured and arranged to receive a signal from the detector representative of the detected portions of the electromagnetic pulse and to analyze it to determine a level of the surface of each of the two fluids.

Another aspect of an embodiment of the present invention includes a system for measuring a fluid level in a wellbore, including a frequency generator, positionable and operable to produce at least two electromagnetic frequency signals to propagate along the wellbore towards a surface of the fluid, a detector, positionable and operable to detect a portion of the electromagnetic signals reflected from the surface of the fluid and propagated along the wellbore towards the detector, and a processor, configured and arranged to receive the signals from the detector representative of the detected portions of the electromagnetic signals and to analyze them to determine a level of the surface of the fluid.

Another aspect of an embodiment of the present invention includes a method for controlling a pump located in a casing-lined wellbore that includes generating a pulse of electromagnetic energy to propagate along the wellbore towards a surface of the fluid, detecting a portion of the electromagnetic pulse reflected from the surface of the fluid and propagated along the wellbore towards the detector, receiving a signal from the detector representative of the detected portion of the electromagnetic pulse, and analyzing the signal to determine a level of the surface of the fluid, and controlling the operation of the pump, based on the determined surface level of the fluid.

Another aspect of an embodiment of the present invention includes a method for measuring a fluid level in a casing-lined wellbore that includes generating a pulse of electromagnetic energy to propagate along the wellbore towards a surface of the fluid, detecting a portion of the electromagnetic pulse reflected from the surface of the fluid and propagated along the wellbore towards the detector, receiving a signal from the detector representative of the detected portion of the electromagnetic pulse, and analyzing the signal to determine a level of the surface of the fluid.

Another aspect of an embodiment of the present invention includes a method of measuring two unmixed fluid levels in a wellbore containing a first wellbore fluid and a second wellbore fluid, the second wellbore fluid having and a lower density than that of the first fluid and a dielectric constant that is both known and substantially lower than that of the first fluid, including generating a pulse of electromagnetic energy to propagate along the wellbore towards a surface of the fluids, detecting respective portions of the electromagnetic pulse reflected from the surfaces of the fluids and propagated along the wellbore towards the detector, and receiving a signal from the detector representative of the detected portions of the electromagnetic pulse and analyzing it to determine a level of the surface of each of the two fluids.

Another aspect of an embodiment of the present invention includes a method of measuring a fluid level in a wellbore, including generating at least two electromagnetic signals having respective different frequencies to propagate along the wellbore towards a surface of the fluid, detecting respective portions of the electromagnetic signals reflected from the surface of the fluid and propagated along the wellbore towards the detector, and receiving signals from the detector representative of the detected portions of the electromagnetic signals and analyzing them to determine a level of the surface of the fluid.

Another aspect of an embodiment of the present invention includes a system and method in which a digital delay line is used to implement a time to digital converter to define a detection window for detecting the respective portions of the reflected electromagnetic pulse.

Aspects of embodiments of the present invention include computer readable media encoded with computer executable instructions for performing any of the foregoing methods and/or for controlling any of the foregoing systems.

DESCRIPTION OF THE DRAWINGS

Other features described herein will be more readily apparent to those skilled in the art when reading the following detailed description in connection with the accompanying drawings, wherein.

DETAILED DESCRIPTION

Figure 1:
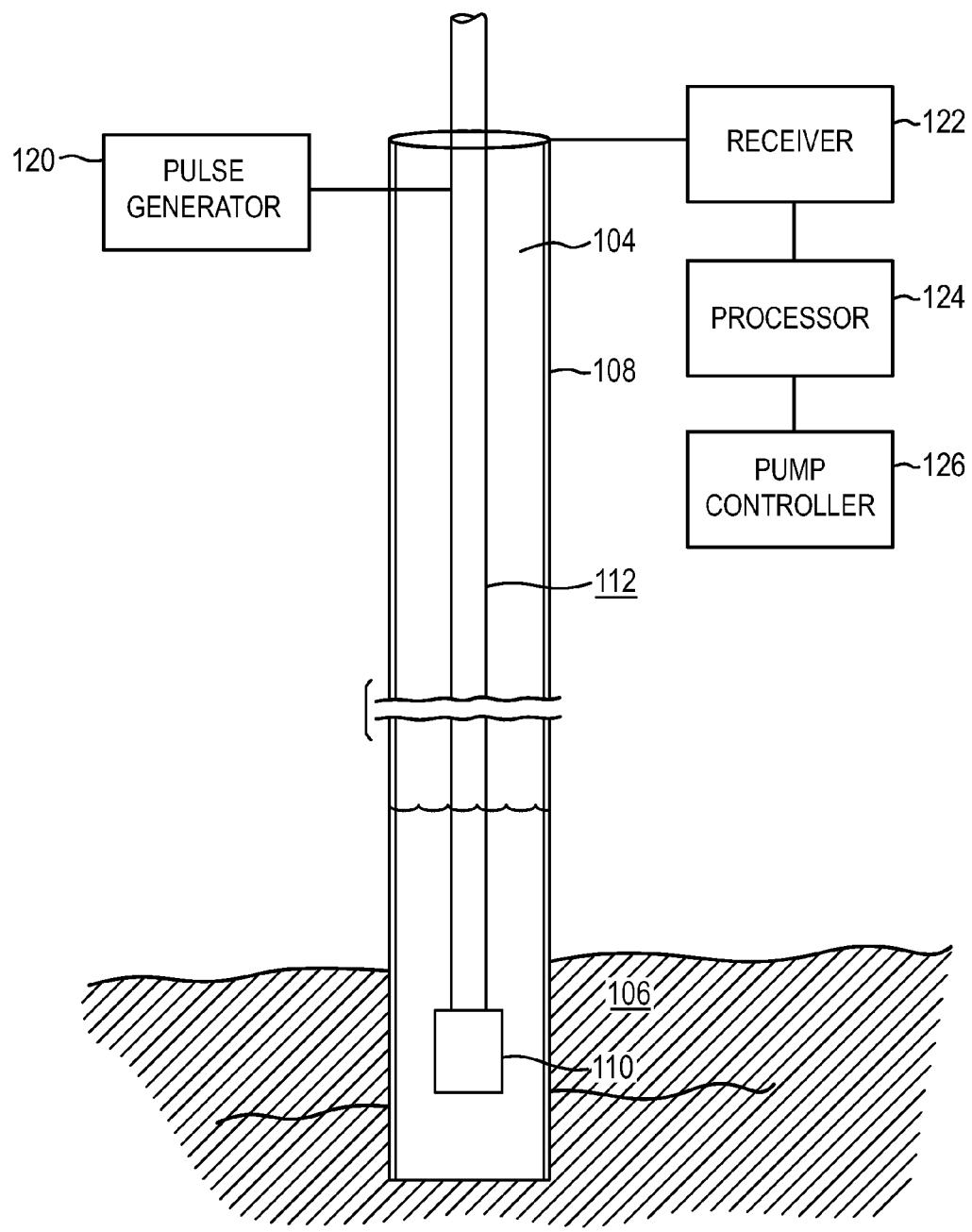
FIG. 1 is a schematic illustration of a system for remotely measuring a fluid level in a borehole in accordance with an embodiment of the present invention.

FIG. 1 illustrates an example of an apparatus 100 for sensing a surface level of a fluid 102 in a borehole 104. In the illustrated example, the borehole 104 extends through a hydrocarbon producing formation 106. Though the borehole 104 is illustrated as a straight, vertical bore, in practice the borehole will have a more complex geometry and can have any orientation, including varying orientation along its length.

The borehole is lined with a hollow casing 108 made up of a number of segments of generally conductive material. The hollow borehole casing 108 can, for example, be configured of steel or other suitable material. In a typical drilling application, the borehole casing 108 may be a standard casing used to provide structural support to the borehole in ordinary drilling and production applications and it is not necessary to provide any additional outer conductive medium.

Hydrocarbon production is facilitated when pressure in the producing formation 106 is greater than pressure within the borehole 104. In this regard, the level of the fluid 102 is important, as any accumulated fluid 102 within the borehole 104 that is at or above the level of the producing formation 106 will exert a pressure in opposition to the pressure of the producing formation 106.

It is useful to provide a downhole pump 110 that can produce artificial lift to facilitate production of oil or gas from the producing formation 106. The liquids from the formation are typically pumped to the surface via tubing 112, while gas rises to the surface by way of the annular area between the tubing 112 and the casing 108. It is generally wearing on such pumps for them to run dry should the fluid level in the borehole drop below an operating position of the pump 110. Thus, there is a balance to be struck between minimizing the fluid level to reduce counterproductive pressure in the borehole 104 and ensuring that pumps present in the borehole 104 are not allowed to run dry.

Examples of the types of downhole pumps that are used in this application include electrical submersible pumps, progressing cavity pumps, sucker-rod pumps and others.

In order to facilitate pump control such that fluid levels are kept low, but high enough to avoid running the pump dry, it is useful to provide for measurement of the fluid level. In embodiments, such measurement may be performed continuously and in real time. The fluid level measurement may usefully accommodate potentially confounding factors such as joints in the borehole casing or foaming near the fluid surface, which can produce incorrect measurements.

The apparatus 100 for measuring the fluid level includes a pulse generator 120. The pulse generator 120 is configured to produce an electromagnetic pulse, which will be transmitted along the length of the borehole, with the casing acting as a waveguide. In this case, the tubing 112 acts as a central conductor and the casing/tubing system together essentially form a coaxial cable.

The pulse generator 120 may be coupled into the borehole by a direct attachment or may be otherwise electromagnetically coupled to the borehole.

The pulse generator 120 may be any device including, but not limited to, an electronic structure for receiving electromagnetic energy and generating a signal therefrom. Examples of suitable pulse generators include spark gap generators, a network analyzer such as a Bode box or other devices that, for example, make use of fast switching components such as avalanche transistors or fast silicon controlled rectifiers (SCRs). Useful devices include those that are capable of producing 10-100A with a voltage that can be varied by 30V/ns or more. In general, radio frequency electromagnetic pulses are well-suited to this application, in particular in a range from about 3 MHz to 100 MHz. The frequency can be selected as a function of the material characteristics of the conductive pipe (e.g., steel). Skin depth can limit use of high frequencies above a certain point, and a lower end of the available frequency range can be selected as a function of the simplification of the construction of the pulse generator.

As the pulse propagates along the borehole, changes in impedance result in partial reflections of the energy of the pulse, which reflections may be received at the surface with a receiver or detector 122 module of the apparatus 100. Such impedance changes may result from joints in the casing, the presence of objects in the borehole, or the like. In the case of a fluid with a relatively low dielectric constant such as crude oil, a partial reflection of the remaining energy in the electromagnetic pulse occurs at the fluid interface. In the case of a fluid with a relatively high dielectric constant, such as a mixture containing significant portions of water, a near total reflection of the remaining energy in the electromagnetic pulse occurs as the fluid acts to short circuit the borehole.

A processor 124 is used to analyze the received signals to determine the fluid level. Furthermore, the processor 124 may be used to operate a pump controller 126 to change an operation state of the pump 110, based on the measured fluid level. The pump controller may be linked directly (not shown) or wirelessly to the pump 110. In particular, the pump controller 126 may reduce pumping capacity by adjusting pump operation speed or stroke if the fluid level is near (within a few feet or a few tens of feet) the pump level, or it may stop the pump completely if the pump level is above the fluid level. Similarly, if the fluid level in the wellbore rises higher than is necessary to keep the pump from running dry, the controller may increase pump capacity. The amount higher than pump level at which pump capacity should be increased may be selected, either by a user or it may be pre-determined and programmed into the controller.

Successive measurements may be used to determine a magnitude and direction of change of the fluid level. In this embodiment, either or both of the magnitude and direction may be used to control the pump capacity. Thus, if the fluid level is changing rapidly, the pump capacity may be changed rapidly as well. Likewise, if the fluid level is near the pump level, but is increasing, the controller may reduce pump capacity by only a small amount in order to maintain the fluid level rather than reducing by a large amount which may tend to increase the fluid level undesirably.

Figure 2:
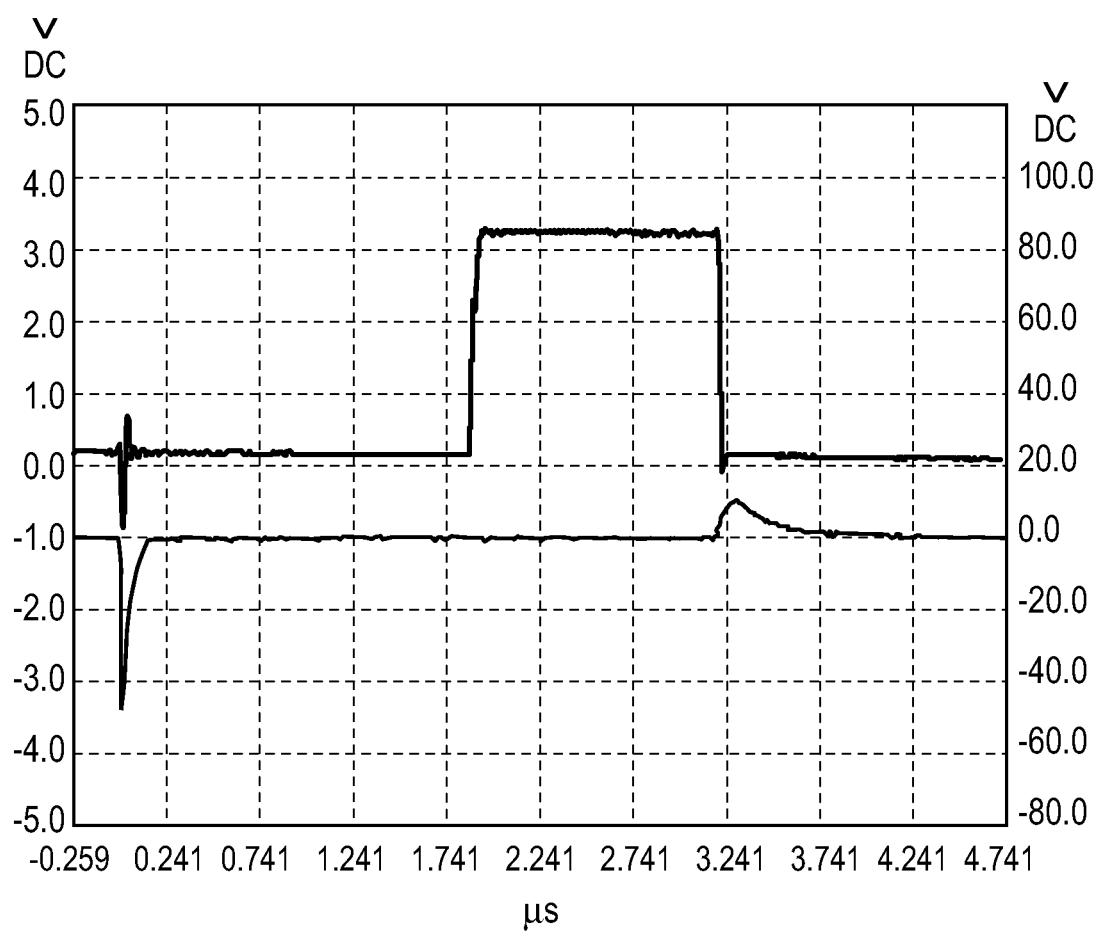
FIG. 2 is a trace illustrating a return signal reflected from a location in a simulated borehole.

FIG. 2 is a trace of a return signal from a simulated 1600 foot well received by the receiver 122. Based on a measure of the time delay between launching the pulse and receiving the return signal, a distance along the borehole can be calculated using the processor 124:

$$d = t \cdot c \qquad \text{Eqn. 1}$$

where d is the total distance to the fluid and back again to the detector at the surface, i.e., double the distance between the surface and the fluid, t is the delay time and c is the speed of propagation of the electromagnetic energy in air.

The top line of FIG. 2 represents detector on-time. When the voltage is high (about 3V), the detector is on. As illustrated, this corresponds to times between about 1.741 µs and about 3.241 µs. In this example, once a signal is detected, the detector is powered off, though this is not a requirement. The lower line in FIG. 2 represents the detected signal. As may be seen, an impulse was recorded at about 3.241 µs. As described above, this time represents twice the time the signal takes to propagate along the well in one direction. Therefore, the distance from the surface to the fluid is, as expected, about 1600 ft (where one foot is approximately equivalent to a 1 ns delay).

In an embodiment, a threshold may be set, such that returns below the threshold which are more likely to represent casing joints, for example, are ignored. In one approach, a user may set a delay such that no returns received prior to the end of the delay time are allowed to trigger the apparatus, thereby reducing false readings. In FIG. 2, this corresponds to the interval between zero and 1.741 µs. A longer delay would result in a more narrow measurement window such that the top line of FIG. 2 would show a narrower square wave shape, corresponding to a single grid box width, for example. In this approach, the user may base the delay on known information relating to a general location of the fluid level, such as may be obtained from acoustic or gravimetric techniques.

In an embodiment, the delay may be implemented by use of a digital delay line to act as a time-to-digital converter (TDC). TDCs are commercially available as integrated circuit packages that include a series of logic gates. Each gate acts to delay a signal passing through by a known amount. In an example, each gate may constitute a delay of tens of picoseconds, for example, 20-120 ps, and the chip design may be selected so as to provide an acceptable resolution, as necessary or desired. The inventors have determined that a resolution between about 40 ps and about 75 ps may be particularly suited to a measurement system in accordance with an embodiment of the present invention.

In particular implementations, it is possible that a prohibitively large number of gates would be required to produce delays on the order of 2-10 µs may be required at typical well depths. Therefore, in conjunction with the gate delays, the signal may be timed with a digital counter that uses a temperature compensated crystal oscillator (TXCO). In one example, the oscillator operates at 7.5 MHz. This "coarse counter" has a resolution of 133.3 ns but acts to extend the measurable timing range. The gate delays are then used as a "fine count" to capture the timing event that occurs between coarse counts. The fine count and coarse count, when combined, will give high resolution timing for long timing measurements.

Signal propagation delays through logic gates have a tendency to vary with temperature. On the other hand, gates of the same type co-colated on the same integrated circuit will tend to vary in the same manner. The coarse counting TXCO is calibrated for a high accuracy across a wide range of temperatures. The gate delay time may be calibrated by using the gates to measure one or tow clock cycles of the TXCO. The single gate delay is then calculated based on the number of gates through which the signal passed in one accurate clock period.

The system as described may be used to obtain measurements with accuracy on the order of one foot or so (i.e., one nanosecond in the time domain). In general, measurements accurate to within about 10 feet are sufficient to allow reasonable pump control.

In another embodiment, the pulse generator 120 may be configured to generate electromagnetic frequency signals, or tones, and the processor 124 configured to analyze the reflections in the frequency domain. In this embodiment, a first frequency signal is injected and a first reflected signal phase is measured. A second frequency signal is injected and a second reflected signal phase is measured. The first reflected phase is compared to the second reflected phase to calculate the distance between the tone generator to the surface of the fluid. This can be accomplished using Eqn. 2 below.

$$l = -\frac{c_o}{\sqrt{\varepsilon_r} \cdot 2\pi} \cdot \frac{\delta\phi}{\delta f} \cdot \frac{1}{2} \qquad \text{Eqn. 2}$$

Where:
l=length to the fluid surface (m)
$c_0$=the speed of EM propagation in free space (m/s)
$\varepsilon_r$=the relative dielectric constant of the insulating material of the transmission line. (In this case air or methane)
$\delta\phi$=the change in phase (radians)
$\delta f$=the change in frequency (Hz)
$2\pi$=constant used to equate frequency to radians
½=constant used to adjust for the fact that both the original and reflected signal must each travel the full length in succession.
Negative sign is used based on the convention that the second frequency chosen is higher than the first frequency chosen Eqn. 2 above applies when the wavelength of the highest frequency signal injected is greater than or equal to 2l. In this embodiment, the frequency of the highest frequency injected signal should be:

$$f_s = c_0 / [(\varepsilon_r)^{(1/2)} \cdot 2l] \qquad \text{Eqn. 3}$$

In another embodiment, injected signals with frequencies higher than $f_s$ as determined in Eqn. 3 above may be used. In this embodiment the difference in signal frequency between the first and second selected injected signals is less than $f_s$, and the wave length of the first and second selected frequencies signals are within the same whole multiple of 2 l. Analyzing the phase response of a swept frequency input is useful in selecting valid frequency signal pairs to be used.

In one embodiment, a vector network analyzer is used to generate the frequency signals, or tones, and to receive and analyze the reflected frequency signals.

In another embodiment, the injected signal is tuned to a frequency in which the reflected signal is fully in phase or 180 deg out of phase with respect to the injected frequency signal. The peak amplitude of the resultant total transmission line signal is used to identify phase alignment. The peak level is maximized when the reflected signal is in phase and is minimized when the reflected signal is out of phase.

In this embodiment, the first reflected frequency signal is phase aligned to the first generated frequency signal. The second generated frequency is tuned to the next higher or lower available frequency to that produces a second reflected signal with the same phase relationship as was achieved with the first frequency.

In this embodiment, the phase difference between the first and second frequencies is $\delta\phi=2\pi$ radians. Equation 2 above is applied to determine the distance to the fluid surface.

Because the conductivity of hydrocarbons differs significantly from that of water, signal strength may be used to allow for determining not just the presence of fluid, but the type. In experimental trials, the amplitude difference in signal between a return from an oil surface and that from a water surface is about 1:1.3. In the case of a mixed oil/water fluid, the oil/water ratio of the mixture is be determined by interpolation of the amplitude of the mixture's reflected signal to that which would be expected at the same depth from both 100% water and 100% oil.

In the case of unmixed fluids, wherein the lower density fluid has a dielectric constant that is significantly lower than that of the higher density fluid, such as is the case with oil with respect to water, return signals are obtained from both fluid interfaces.

When the imposed signal reaches the gas to oil interface, a portion of the signal is reflected back, but much of the signal will continue to propagate to the oil/water interface where the remaining portion of the transmitted signal is reflected back. In such unmixed oil-on-top-of-water scenario, the time between the receipt of the two reflected pulses can be converted into a height of oil based upon the expected rate of signal propagation in the interval occupied by the oil. Establishing the height of standing oil and water columns in the well bore at different time intervals provides comparative measurements for determining the formation oil/water ratio and with other well analysis methods based upon reservoir pressure and production rate correlations.

Figure 3:
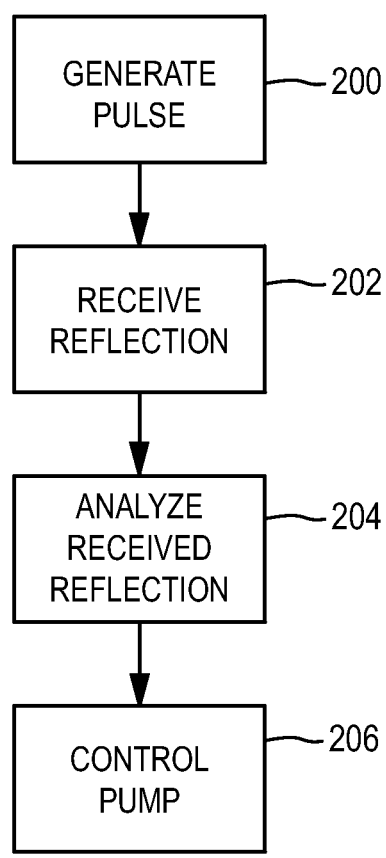
FIG. 3 is a flowchart illustrating a method in accordance with an embodiment of the present invention.

FIG. 3 is a flowchart illustrating a method of operation in accordance with an embodiment of the invention. The pulse generator 120 is used to generate (200) a pulse that propagates along the borehole in a downhole direction. The receiver 122 receives (202), a return signal reflected from the surface of the fluid that is propagated back up the wellbore. The processor 124 then analyzes (204) the received signal to determine a distance to the fluid surface. Based on the determined distance, the pump controller 126 operates to control (206) the operation of the pump 110 as discussed above.

Figure 4:
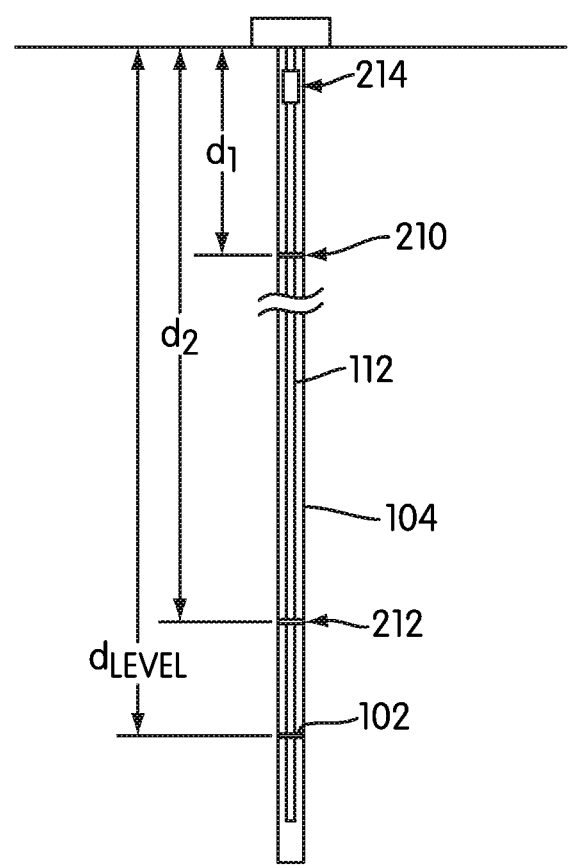
FIG. 4 is a schematic illustration of a system for remotely measuring a fluid level in a borehole incorporating calibration markers in accordance with an embodiment of the present invention.

In an embodiment, impedance changes are introduced purposely into the transmission line. In a particular approach, a marker 210 is placed at a known depth ($d_1$) in the borehole 104, as illustrated in FIG. 4. A second marker 212 is placed at a second known depth ($d_2$) in the borehole 104. In operation, as a pulse propagates along the borehole, each of the two markers will produce a partial reflection of the propagating pulse in addition to the reflection at the fluid interface. Markers may be any structure that alters the impedance of the transmission line. For example, a coaxial choke 214, a wiper arm with a controlled resistance or a conductive annular structure that locally reduces the dielectric distance between the casing and the tubing could act as markers. As noted above, such impedance changes may also exist at casing joints, depths of which may be calculated when the casing is assembled from sections having standard or otherwise known lengths. Markers' structure and composition should be selected to produce a relatively small return, so that a majority of the energy will continue to propagate, maintaining sufficient strength to provide a reflection at the fluid interface.

In this embodiment, it is possible to account for unknown qualities of or changes in dielectric constant of the medium through which the electromagnetic pulse is traveling. In particular, the distance to the surface may be calculated in accordance with Eqn. 4:

$$d=d_2+(d_2-d_1)/(t_2-t_1)\times(t-t_2) \qquad \text{Eqn. 4}$$

where $d_1$ is the distance to the first marker, $t_1$ is the time of arrival of the first reflected signal, $d_2$ is the distance to the second marker, $t_2$ is the time of arrival of the second signal, d is the distance to the reflective surface, and t is the time of arrival of the third signal.

As will be appreciated, the division operation determines an average propagation velocity over the interval between the first and second markers. That velocity is multiplied by the time interval between the second marker and the fluid interface to determine a distance between the second marker and the fluid interface. That is, the formula assumes that velocity of propagation between the first and second markers is the same as the velocity between the second marker and the fluid interface. In this regard, the use of additional markers at additional known depths may allow for additional statistics to be generated to determine whether velocity of propagation is substantially constant along various intervals in the borehole or whether a more complex expression of velocity should be used.

In another embodiment, a single marker could be used The lead-in coaxial cable rarely has the same impedance of the wellbore structure. Therefore, the impedance mismatch at the connection between the two serves as the first marker. In this case, $d_1$ is the distance of the connection below the wellhead and $t_1$ is the reflection time along the lead-in cable. Commercial coaxial cable has significantly different wave propagation velocity than that of the wellbore structure, so this is particularly useful. Further, some wellbore structures have reduced casing diameters at a known distance. The change in the tubular diameter causes an impedance change and a partial reflection of the pulse. Thus, in some wells, the marker element is created by the wellbore structure.

In a particular embodiment, the velocity calibration is performed periodically and statistics are recorded. Where the recorded statistics provide a pattern of change, that pattern may be used as an input to the depth calculation. Likewise, the recorded statistics may be used to calculate a degree of uncertainty of the measurement system. Alternately, or in conjunction with the foregoing approaches, drifting calibration velocities may be taken as an indicator of systematic changes in the medium within the borehole. For example, changes in dielectric constant may indicate changes in temperature or humidity in air within the borehole. In an embodiment for use in a stem injection well, humidity measurements could provide information relating to the steam quality (i.e., the amount of water present in liquid phase versus gaseous phase in the steam).

As noted above, an oil/air interface would be expected to provide a relatively low signal strength due to the relatively small impedance (i.e., dielectric constant) mismatch between air and oil as compared with air and water. Therefore, in an embodiment, a material that will increase the reflectivity of the interface is introduced at the fluid interface.

The reflectivity-increasing material typically has a density selected to ensure that it will float on top of the fluid surface. In this regard, the density should have a density not only less than water, but less than that of oil that may be floating on top of the water. For example, a specific gravity of less than about 0.7 (dimensionless) should ensure that the material will float irrespective of whether oil is present in the fluid. The material may, in some embodiments, be floated in a relatively thin layer at the surface of the fluid.

Furthermore, useful materials for this application should not be miscible in either water or oil, thereby ensuring that the material remains floating rather than becoming mixed into the fluid. Finally, in order to produce the desired increase in reflectivity, the material should be conductive, have a dielectric constant somewhat higher than that of crude oil, and/or have ferrous properties. By way of example, a value of 5 (about double that of oil at 2-3) may be sufficient to provide this functionality.

In this regard, a number of materials having the above properties are proposed. First, low density solids (i.e., where low density in this case means a specific gravity of less than 0.7) such as polymers or hollow glass beads may be used. Polymers may be in pellet or flake form, or in a hollow bead form. In either case, the beads may be entirely hollow, or may encapsulate another material to achieve the desired dielectric properties. By way of example, hollow glass microspheres having a nickel coating (coated by, e.g., vapor deposition) would be suitable.

The material may alternately be a low density liquid such as methanol. Though methanol is miscible in water, for the case where there is a known oil surface at the interface, the oil layer can act to maintain separation between the water and the methanol. Alternately, a colloidal suspension of a material that meets the above requirements could be employed. As an example, a colloidal suspension of iron oxide in a sufficiently low density medium would fit the criteria.

In one embodiment, the material is introduced and remains floating on the surface at the interface. In an alternate embodiment, re-application of the material could be employed. In this regard, the material could be delivered by a feeding system that is positionable within the borehole and/or at a location that allows injection into the borehole.

The above system is generally described as using the well casing and drill string as a transmission line for the signal to be reflected. In an alternate approach, the signal is transmitted using spoolable conductor placed in the borehole for this purpose. Such an arrangement may find applicability, for example, in an uncased borehole, or in a borehole in which there are breaks in the conductivity of the casing or in which the drill string and casing are in intermediate or constant contact, introducing a short.

Figure 5A:
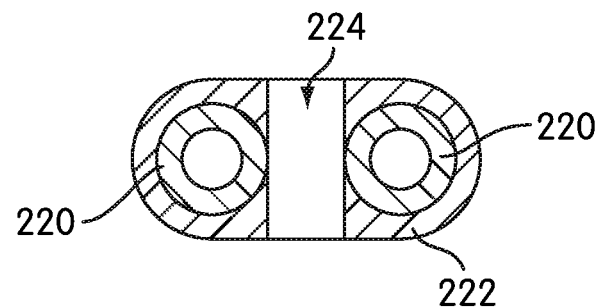
FIG. 5a is a transverse cross sectional schematic illustration of a transmission line for use in an embodiment of the present invention.
Figure 5B:
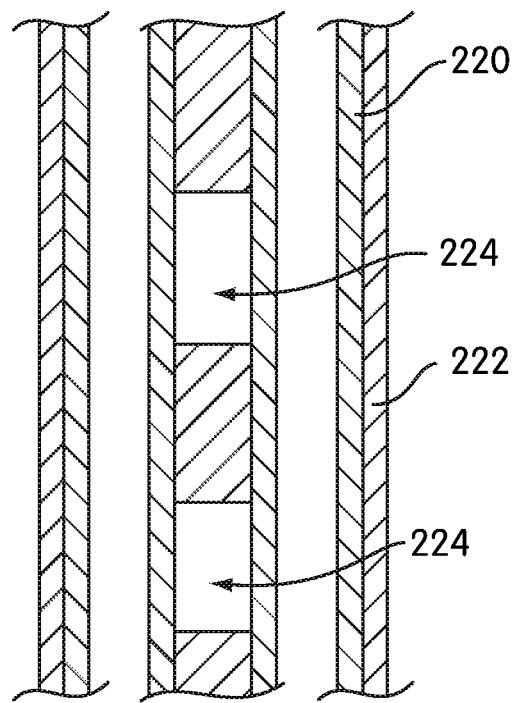
FIG. 5b is a longitudinal cross sectional schematic illustration of a transmission line for use in an embodiment of the present invention.

In some circumstances, umbilicals are deployed within the borehole for a variety of purposes. In one example, insertable dewatering systems include metal tubing that is used to provide flow paths for fluid being removed from the borehole. As shown in FIGS. 5a and 5b, one such umbilical of this type includes two stainless steel flow paths 220 surrounded by an insulating layer 222.

In order to allow the measurement of the fluid interface, fluid should be allowed to flow between the two conductors freely. As shown in FIGS. 5a and 5b, selective sections 224 of the insulation are removed at least within a region of interest along the length of the umbilical. That is, there need not be any removed sections over intervals where no measurement will be taken (e.g., an initial length of the umbilical). The removed sections should be positioned and dimensioned to allow fluid to freely flow into the gap between the conductors, and also to allow fluid to freely flow out of the gap when the fluid level drops relative to the transmission line.

Distances between sections and section size will depend in part on the measurement of interest. For example, for a pump control system, a one inch section every 12 inches may be appropriate. In other situations, it may be useful to have sections on approximately one inch intervals.

As will be appreciated, the umbilical that bears the transmission line into the borehole need not be a part of a dewatering system, or any particular component. To the contrary, the principle of the invention is applicable to any spooled system that might be introduced into the wellbore for use in operations, or even to a separate line altogether. In principle, what is required is a pair of conductors. The pair may be provided by using a two conductor line, or a single conductor line that cooperates with the tubing, casing, or drill string to provide the second conductor.

Control lines for use with downhole pressure transducer (DHPT) gauges, chemical injection systems, hydraulic control lines, tubing encased or encapsulated conductor (TEC), instrument wire (i-wire), or the like can be used either to bear a conductor or as the conductor itself. Such control lines, when appropriately insulated, are suitable for use as the conductor in the system described above. In embodiments, the control lines may be positioned outside the tubing, or form a portion of an insert assembly that is installed within the tubing.

Those skilled in the art will appreciate that the disclosed embodiments described herein are by way of example only, and that numerous variations will exist. The invention is limited only by the claims, which encompass the embodiments described herein as well as variants apparent to those skilled in the art. In addition, it should be appreciated that structural features or method steps shown or described in any one embodiment herein can be used in other embodiments as well.

The invention claimed is:

1. A system for measuring a fluid level in a wellbore, comprising:
    a pulse generator, positionable and operable to generate a pulse of electromagnetic energy to propagate along the wellbore towards a surface of the fluid;
    a detector, positionable and operable to detect a portion of the electromagnetic pulse reflected from the surface of the fluid and propagated along the wellbore towards the detector;
    a processor, configured and arranged to receive a signal from the detector representative of the detected portion of the electromagnetic pulse and to analyze it to determine a level of the surface of the fluid; and
    a digital delay configured and arranged to define a detection time window for detecting the portion of the electromagnetic pulse reflected from the surface of the fluid.

2. A system as in claim 1, further comprising a pump controller, configured and arranged to receive distance information from the processor and to use the distance information to control the operation of a pump located in the wellbore.

3. A system as in claim 1, wherein the processor is further configured and arranged to analyze the signals to obtain information relating to a proportion of water to hydrocarbon in the fluid based on an amplitude of the detected portion.

4. A system as in any of claim 1, wherein the pulse propagates along the wellbore via a transmission line comprising a pair of electrical conductors electrically isolated from each other.

5. A system as in claim 4, wherein one of the conductors comprises at least one well component selected from the group consisting of well casing, tubing, a drill string, an umbilical, a control line, a hydraulic line or, a TEC (Tubing Encased Conductor).

6. A system as in claim 5, wherein the transmission line comprises a pair of conductive lines having insulation thereon, the insulation having gaps therein at selected intervals along at least a portion of a length of the transmission line, the gaps being sized and configured to allow fluid to flow therein when positioned below the level of the surface of the fluid.

7. A system as in any of claim 4, further comprising at least one marker positionable at a known depth wherein, in use, the detector is further positionable and operable to detect a further portion of the electromagnetic pulse reflected from the marker and the processor is further configured and arranged to receive a further signal from the detector representative of the detected further portion of the electromagnetic pulse, and to analyze the received signal and the further received signal in conjunction with each other so as to determine the level of the surface of the fluid.

8. A system as in claim 1, wherein the digital delay comprises a TDC gate array.

9. A system for measuring two unmixed fluid levels in a wellbore containing a first wellbore fluid and a second wellbore fluid, the second wellbore fluid having a lower density than that of the first fluid and a dielectric constant that is both known and substantially lower than that of the first fluid, comprising:
   a pulse generator, positionable and operable to generate a pulse of electromagnetic energy to propagate along the wellbore towards a surface of the fluids;
   a detector, positionable and operable to detect respective portions of the electromagnetic pulse reflected from the surfaces of the fluids and propagated along the wellbore towards the detector;
   a processor, configured and arranged to receive a signal from the detector representative of the detected portions of the electromagnetic pulse and to analyze it to determine a level of the surface of each of the two fluids; and
   a digital delay configured and arranged to define a detection time window for detecting the portion of the electromagnetic pulse reflected from the surface of the fluid.

10. A system as in claim 9, wherein the pulse propagates along the wellbore via a transmission line comprising a pair of electrical conductors electrically isolated from each other.

11. A system as in claim 9, wherein one of the conductors comprises at least one well component selected from the group consisting of well casing, tubing, a drill string, an umbilical, a control line, a hydraulic line or, a TEC (Tubing Encased Conductor).

12. A system as in claim 9, wherein the transmission line comprises a pair of conductive lines having insulation thereon, the insulation having gaps therein at selected intervals along at least a portion of a length of the transmission line, the gaps being sized and configured to allow fluid to flow therein when positioned below the level of the surface of the fluid.

13. A system as in claim 9, wherein the digital delay comprises a TDC gate array.

14. A system for measuring a fluid level in a wellbore, comprising:
   a frequency generator, positionable and operable to produce at least two electromagnetic frequency signals to propagate along the wellbore towards a surface of the fluid;
   a detector, positionable and operable to detect a portion of the electromagnetic signals reflected from the surface of the fluid and propagated along the wellbore towards the detector;
   a processor, configured and arranged to receive the signals from the detector representative of the detected portions of the electromagnetic signals and to analyze them to determine a level of the surface of the fluid; and
   a digital delay configured and arranged to define a detection time window for detecting the portion of the electromagnetic pulse reflected from the surface of the fluid.

15. A system as in claim 14, wherein the detector is configured and arranged to detect phase information of the detected portions of the electromagnetic signals and the processor is configured and arranged to analyze the detected phase information to determine the level of the surface of the fluid.

16. A system as in claim 14, further comprising a pump controller, configured and arranged to receive distance information from the processor and to use the distance information to control the operation of a pump located in the wellbore.

17. A system as in claim 14, wherein the digital delay comprises a TDC gate array.

18. A method of measuring a fluid level in a wellbore, comprising:
   generating a pulse of electromagnetic energy to propagate along the wellbore towards a surface of the fluid;
   detecting a portion of the electromagnetic pulse reflected from the surface of the fluid and propagated along the wellbore towards the detector;
   defining a detection time window for the detecting by using a digital delay; and
   receiving a signal from the detector representative of the detected portion of the electromagnetic pulse and analyzing it to determine a level of the surface of the fluid.

19. A method as in claim 18, wherein the digital delay comprises a TDC gate array.

* * * * *